June 28, 1955     W. S. TAYLOR     2,711,684
COMBINED TOASTER AND GRILL
Filed June 25, 1953     7 Sheets-Sheet 1

INVENTOR.
William S. Taylor

June 28, 1955    W. S. TAYLOR    2,711,684
COMBINED TOASTER AND GRILL
Filed June 25, 1953    7 Sheets-Sheet 2

INVENTOR.
William S. Taylor

June 28, 1955  W. S. TAYLOR  2,711,684
COMBINED TOASTER AND GRILL
Filed June 25, 1953  7 Sheets-Sheet 3

INVENTOR.
William S. Taylor

June 28, 1955  W. S. TAYLOR  2,711,684
COMBINED TOASTER AND GRILL
Filed June 25, 1953  7 Sheets-Sheet 4
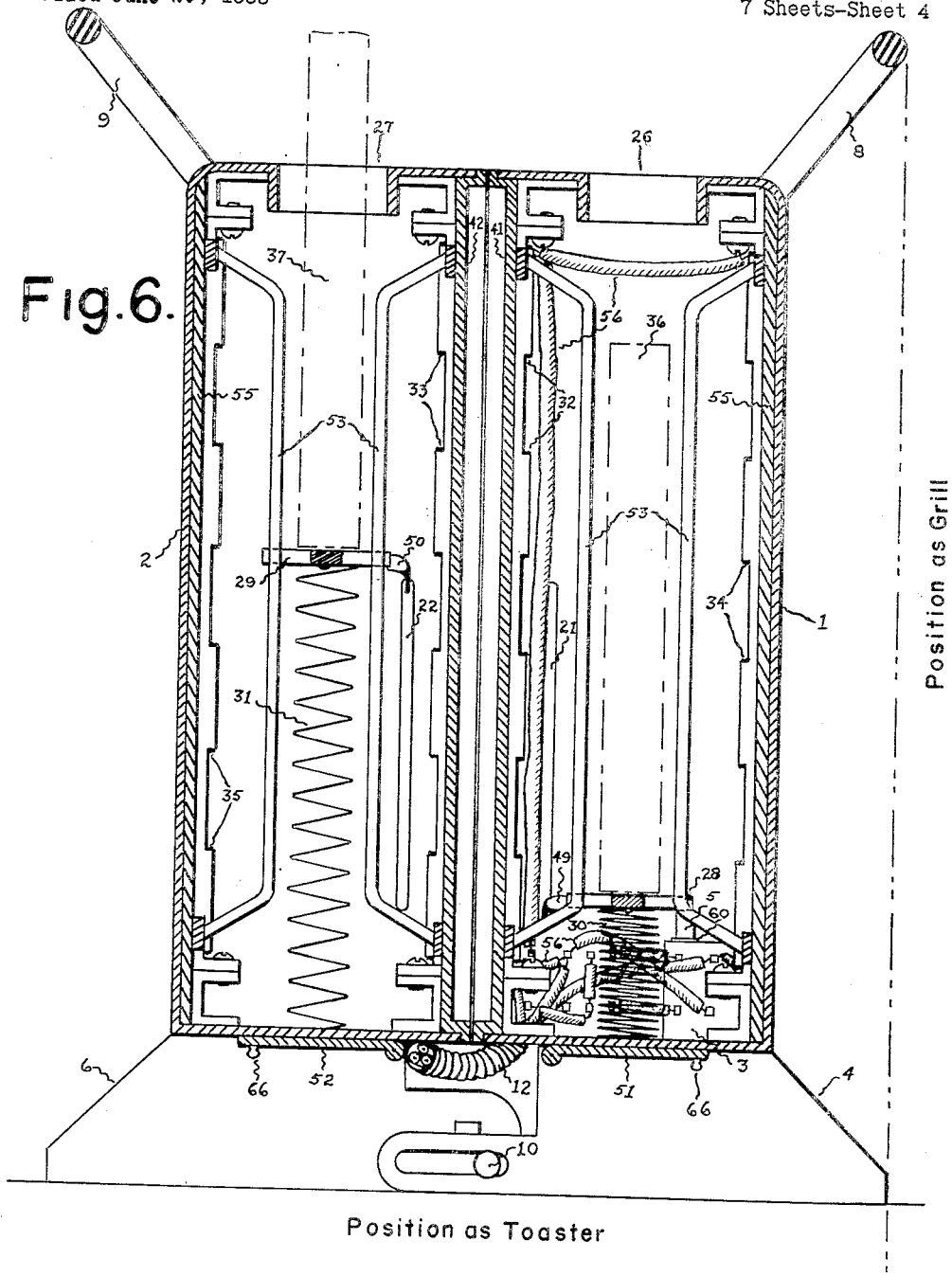
INVENTOR.
William S. Taylor

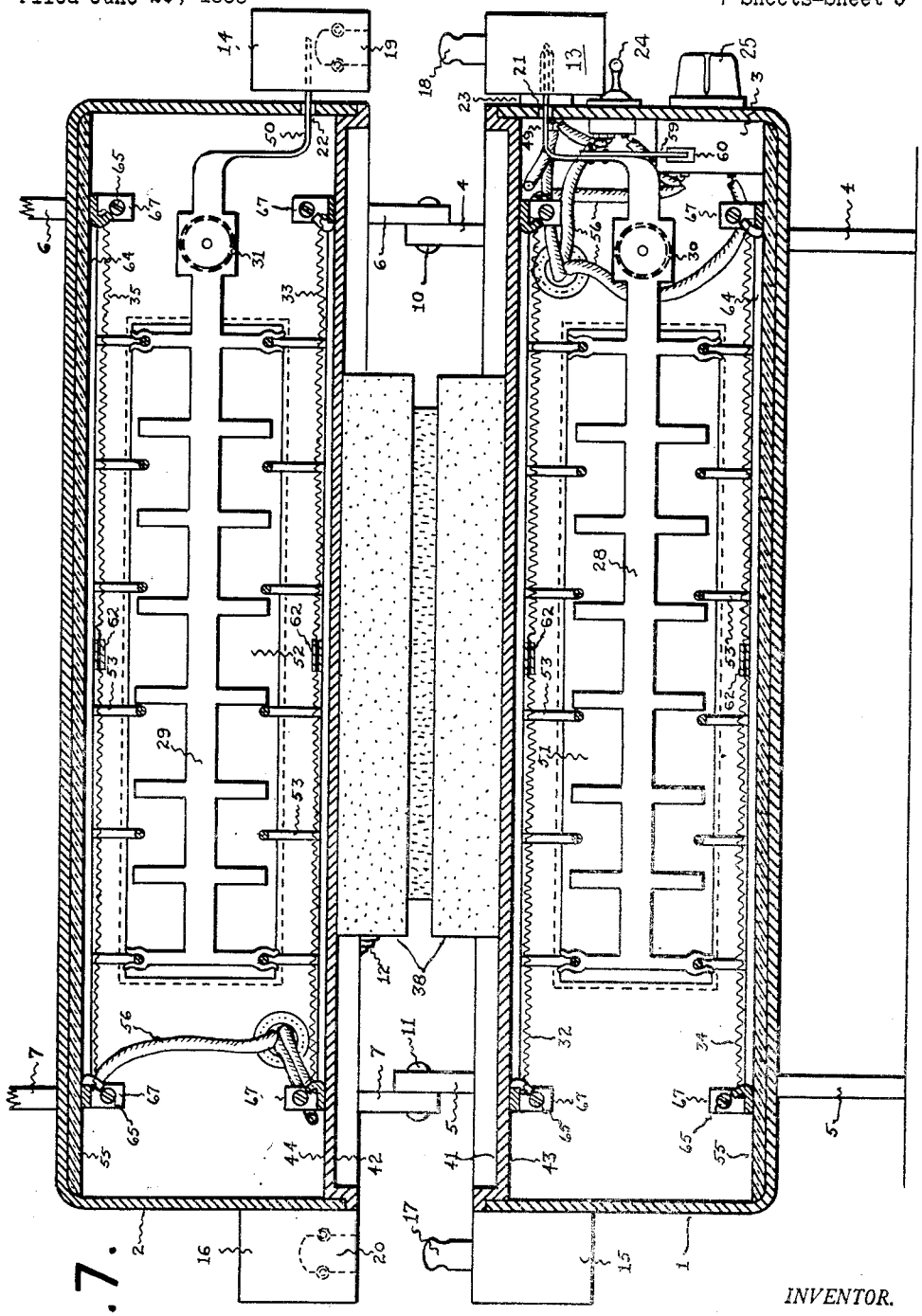

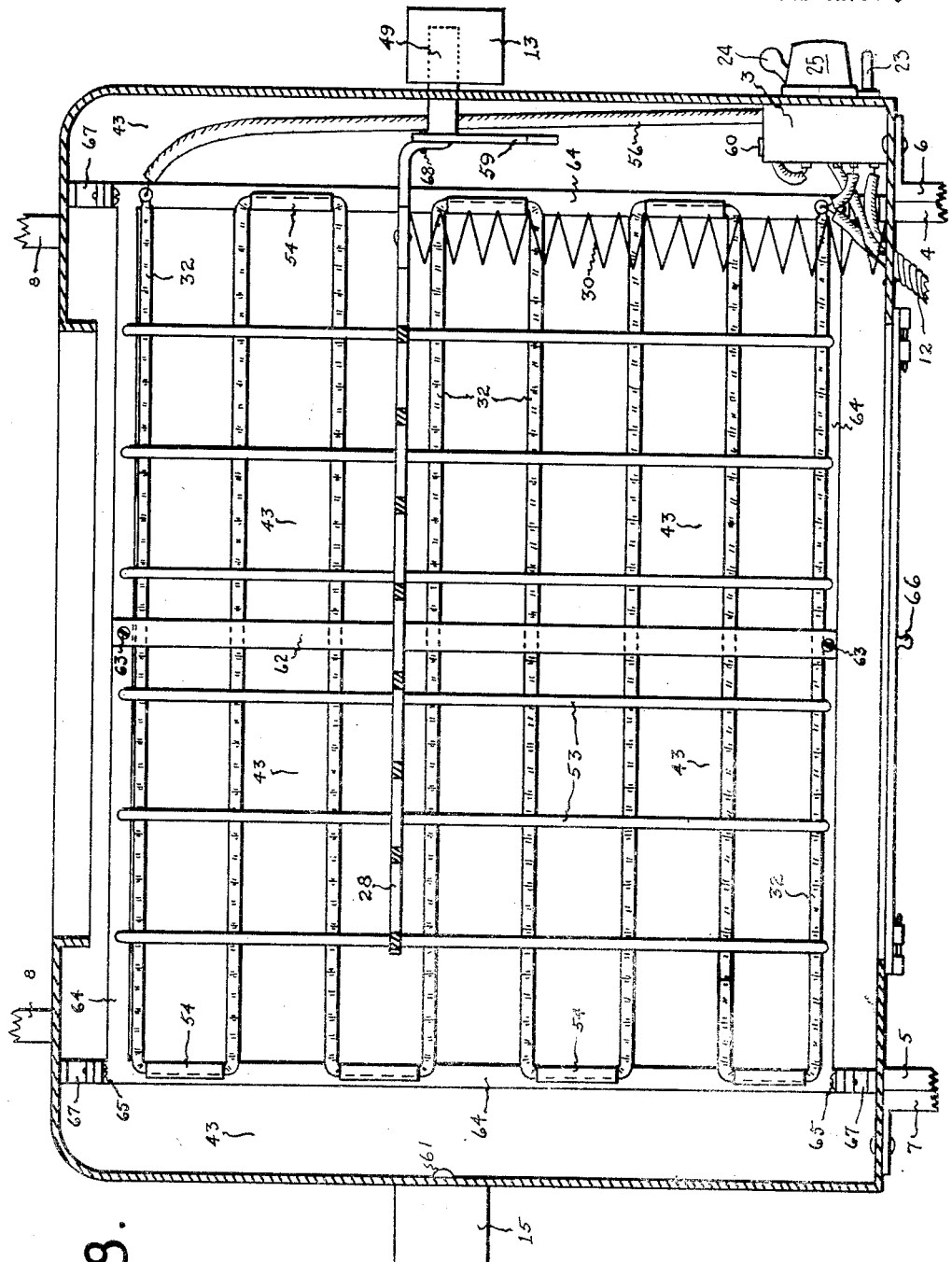

INVENTOR.
William S. Taylor

United States Patent Office 2,711,684
Patented June 28, 1955

2,711,684

COMBINED TOASTER AND GRILL

William S. Taylor, Arlington, Va.

Application June 25, 1953, Serial No. 364,015

3 Claims. (Cl. 99—340)

This invention relates to a combined toaster and grill. This application is an improvement on the construction disclosed in my application Serial No. 259,556, filed December 3, 1951, now abandoned.

For the purposes of simplicity in describing the various features of this new kitchen or restaurant appliance, the term "grilltoaster" is hereinafter used to describe the overall invention.

An object of this invention is to provide a combined toaster and grill which is formed of a pair of pivotally connected together units which are mounted on a plurality of bases so constructed that this device may be used either in a vertical or horizontal position.

Another object of this invention is to provide a combined toaster and grill which is formed of a pair of pivotally connected together units wherein the confronting walls of the units form the grill plates.

A further object of this invention is to provide a combined toaster and grill the components of which are economical to construct, and easy to assemble and which will provide a triple purpose device in a single article.

A further object of this invention is to provide a combined toaster and grill wherein the heating means for the toaster also constitutes the heating means for the grill.

A further object of this invention is to provide a combined toaster and grill wherein it is easy and accessible for the operator to clean out the bread crumbs and food particles which accumulate in the bottom of the toast wells.

A further object of this invention is to provide a combined toaster and grill which requires only one internal control or prime mover unit to raise or lower the bread slice platforms in both separate toaster units.

A further object of this invention is to provide a combined toaster and grill wherein the grill plates can be used for grilling and compressing a sandwich, for example, or the same grill plates can be extended parallel outwards, on the same plane, so as to provide two separate flat grill plate surfaces upon which to simultaneously fry eggs and bacon, for example.

A further object of this invention is to provide a combined toaster and grill with a novel pair of expansible hinges which also support this appliance and which eliminate the need for, at least, one pair of conventional base legs or supports.

With the above and other objects in view, my invention consists in the arrangement, combination and details of construction disclosed in the drawings and specification, and then more particularly pointed out in the appended claims.

In the drawings:

Figure 6 is a sectional view taken on the line 6—6 of Figure 5.

Figure 7 is a fragmentary sectional view taken on the line 7—7 of Figure 5.

Figure 8 is a fragmentary sectional view taken on the line 8—8 of Figure 3.

Figure 1:
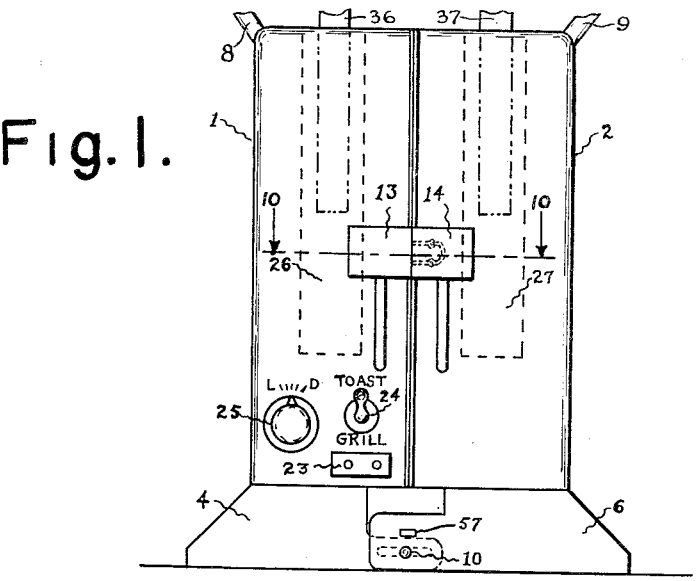
Figure 1 is an end view of a combined grill and toaster constructed according to an embodiment of this invention, in the toasting position.

Referring to the drawings, the numerals 1 and 2 designate generally a pair of single-slice toaster units which are pivotally secured together by a pair of expansible hinges 4, 6, and 5, 7. Unit 1 is the master unit in that it contains the toast control unit 3, electric plug 23, switch 24, and toast control knob 25. Unit 1 is essentially constructed with the features of a single-slice, automatic, pop-up toaster with the exception that one wall of this unit is a grill plate 41 which is heated by the toast heating element 32 contained within unit 1.

Unit 2 is essentially constructed the same as unit 1 and also has one wall which serves as a grill plate 42 which is heated by the elements 33. However, unit 2 does not contain an internal control unit and for this reason depends upon the interlocking action of levers 13 and 14 and the snap catch components 18 and 19 to transmit the control or power action of unit 3 to the bread slice platform 29. Insulating plate or wall 55 is composed of asbestos or the like, and serves to keep this appliance cool.

All four expansible hinge components 4, 6 and 5, 7 are secured to the outside of units 1 and 2 by means of bolts 69. Hinge 4 rotates and slides on pivot rivet 10 which is embedded in hinge 6. Hinge 5 rotates and slides on pivot rivet 11 which is embedded in hinge 7. Dimpled stops 57 are located in hinges 6 and 7. All four hinge components 4, 5, 6 and 7 can be made of metal or formed of a molded insulating composition such as phenolic resin or the like. If these hinges are made of metal, it may be desirable to place an asbestos or mica insulation sheet in between where hinges 4, 5, 6 and 7 are bolted at 69 to units 1 and 2. This would tend to reduce heat conduction from units 1 and 2 to these hinges.

Grill plates 41 and 42 also act as walls of units 1 and 2. It is desirable that the grill undersides 43 and 44 be coated with a heat absorbing paint, or like coating, in order to obtain maximum absorption of the heat radiated from the elements 32 and 33. Grill plates 41 and 42 are removably secured to units 1 and 2 by means of clips 45, 46, 47 and 48 which are an integral part of the grill plates themselves. The ends of these clips are snapped or bent into small slits in the shell of units 1 and 2 and thereby hold the plates 41 and 42 to the units 1 and 2. When these clips are bent outwards from the slits in units 1 and 2, the plates 41 and 42 can be easily removed. This arrangement is one of several methods for attaching the removable grill plates inherent in this appliance. The removable feature of the grill plates also opens up the possibility of using waffle grids in the appliance.

Figure 2:
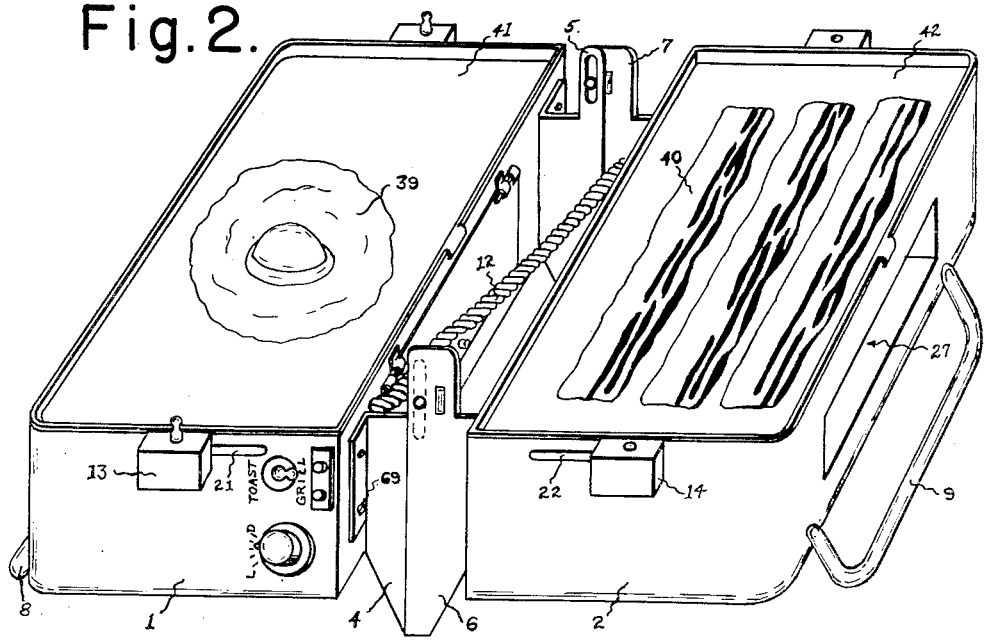
Figure 2 is a perspective view of the combined grill and toaster shown in the grilling position.

Handles 8 and 9 are bolted to the shell of units 1 and 2 respectively and are formed of a molded insulating composition such as phenolic resin or the like. When the grilltoaster is used as a toaster as shown in Fig. 1, handles 8 and 9 serve as handles. When this device is sued as a grill as shown in Fig. 2, handles 8 and 9 serve as base legs.

Figure 3:
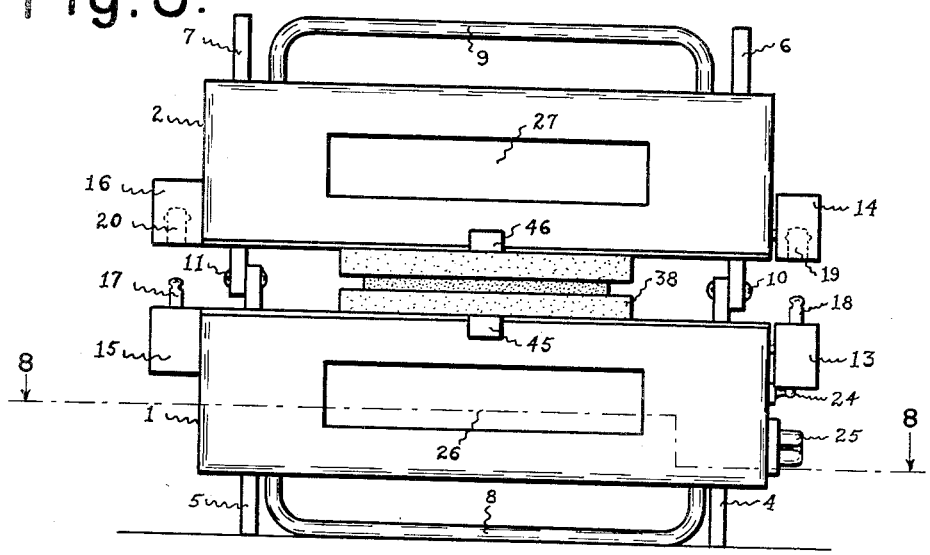
Figure 3 is a front view of the combind grill and toaster as it would appear in sandwich grilling position.
Figure 10:
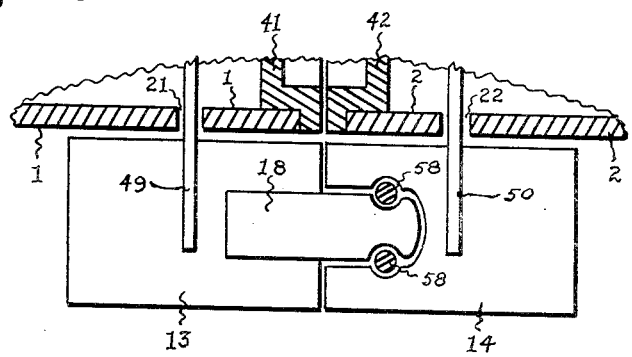
Figure 10 is a fragmentary sectional view taken on the line 10—10 of Figure 1.

Snap catch members 17, 18, 19 and 20 plus inner split rings 58 are conventional snap catch components. Male member 17 is fixedly based in lever 15 and imbeds in well 20 where it is releasably retained by split ring 58 as shown in Fig. 3. Male member 18 is fixedly based in lever 13 and imbeds in well 19 and is releasably retained by split ring 58 as shown in Fig. 10. There are several possible variations in the snap-latching technique used to releasably secure units 1 and 2 together. First, the snap catch members 18 and 19 embodied in levers 13 and 14 can be set in smaller fixed members similar to levers 15 and 16, and as such, these new members would be adjacent to, but not a part of, the movable levers 13 and 14. This would require the counter-facing surfaces of levers 13 and 14 to be saw-toothed or grooved so that when units 1 and 2 were snapped together, the levers 13 and 14 would dovetail or mortice together so that their vertical movement would be fixedly interlocked as long as units 1 and 2 were snapped together. The advantage of this arrangement is simply that it would tend to eliminate vibration between units 1 and 2 due to the possibility of play between rod 49 and slot 21, and also rod 50 and slot 22.

Cleaning doors 51 and 52 are hingedly attached to the rear or bottom of units 1 and 2, respectively, and are opened by means of knobs 66. When these doors are open the underside of platforms 28 and 29 are exposed and bread crumbs or other droppings which normally accumulate can be removed from the platforms and inner side of the doors 51 and 52. This feature greatly facilitates the ease of cleaning and maintaining this appliance.

External levers 13, 14, 15 and 16 are formed of a molded insulating composition such as phenolic resin or the like. Levers 15 and 16 are fixedly attached to the sides of units 1 and 2 by bolts 61. The ends of flat rods 49 and 50 are removably embedded in levers 13 and 14 and as such both the levers and the rods move up or down within the limits of slots 21 and 22 which are openings in the shell of units 1 and 2 respectively. Rods 49 and 50 should be closely fitted to the width of slots 21 and 22 in order to minimize the amount of play or vibration which might occur between units 1 and 2 when levers 13 and 14 are snap latched together by the insertion of member 18 into well 19 as shown in Fig. 10.

Rod 49 is a structural continuation of platform 28 as shown in Fig. 8, and rod 50 is a structural continuation of platform 29.

Spring means 30 and 31 are removably secured to the bottom of units 1 and 2 respectively and are also removably secured to the undersides of platforms 28 and 29, respectively.

Heating elements 32, 33, 34 and 35 are the flat ribbon type used in automatic toasters, and are attached to open frames 64 by means of bent holding lips 54 and retainer strips 62. As shown in Figs. 7 and 8 the strips 62 are secured to the frame 64 by means of bolts 63. One strip 62 is placed above the heating element 32 as shown in Fig. 8 and another strip 62 is placed below the element 32, and both strips are then bolted together and to the frame 64 by the bolts 63. This secures or sandwiches the heating elements 32 and 33 in between the strips 62 and thereby reduces any tendency towards vibration or sagging of the heating elements towards the grill undersides 43 and 44 when the grilltoaster is used in a horizontal or grilling position. Frames 64 and strips 62 and lips 54 are all composed of asbestos, mica or a like material. Frames 64 are detachable from mounting brackets 67 by unscrewing the four bolts 65 which are used to secure each frame 64 to the four brackets 67. The toast wire guides 53 are embedded in frames 64. It is emphasized that heating elements 32 and 33 are for the most part openly exposed to the grill plate undersides 43 and 44, respectively.

Plug 23 is a two pronged male plug which is the electrical connection for operating the grilltoaster. Wires 56 are the heat resistant type conventionally used in grills or toasters. Connecting wire 12 joins the electrical circuits of units 1 and 2 and as such is a conventional, heat-resistant, metal coil protected, type of external wire as used in sandwich grills and waffle irons. Toast control unit 3 embodies a conventional timing or thermal control unit and a spring pressed switch 70 which releasably engages catch member 59 for a predetermined period of time after member 59 is admitted inside the unit 3 through opening 60. The timing or thermal control action of unit 3 is adjustable by means of knob 25 which regulates the toasting cycle from "light to dark" and is indicated by the dial markings L to D in Figs. 1 and 2. Catch member 59 is secured to rod 49 and platform 28 by means of bolts 68 so that all of these components are held releasably in the down position as shown in Fig. 6 by the control action of unit 3. When unit 3 releases member 59, the compression action of coil spring 30 automatically raises lever 13 and platform 28 to the top limit of slot 21 as shown in Fig. 8.

Fig. 6 purposely shows bread platforms 28 and 29 out of coordination in order to illustrate both the up and down positions of bread slices 36 and 37. Ordinarily, the interlocking action of the levers 13 and 14 will cause platforms 28 and 29 to be held in the same down position by unit 3, and when released by unit 3 these platforms will automatically rise to the up position as shown in Fig. 1 by the combined compression of coil springs 30 and 31.

Figure 9:
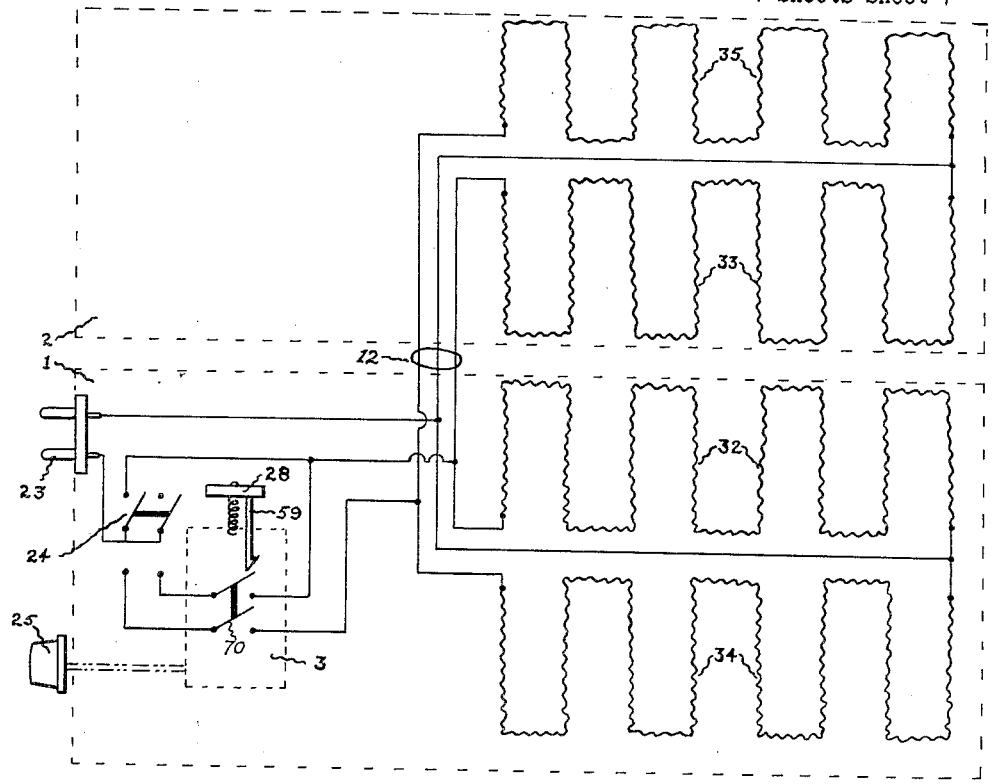
Figure 9 is a diagrammatic view showing the electric circuits embodied in this invention.

Fig. 9 discloses the electric circuits embodied in this invention. When the switch 24 is placed in grill position as shown in Fig. 2 it energizes only the heating elements 32 and 33. This is done in order to keep this appliance relatively cool, and also to reduce unnecessary consumption of electric current. When switch 24 is placed in the "toast" position as shown in Fig. 1, this appliance is ready for toasting bread slices, but depends on member 59 being lowered to the down position as shown in Fig. 6 in order to engage the spring-pressed switch 70 which is normally in a circuit breaking position and which is contained within control unit 3. Switch 70 then energizes all four heating elements 32, 33, 34 and 35 for a predetermined period of time which is dependent upon the control action and setting of unit 3.

The operation of the grilltoaster is as follows: When the grilltoaster is used as a toaster it stands in the vertical position as shown in Fig. 1. When this appliance is used to grill a sandwich 38, it rests in a horizontal position as shown in Figs. 3 or 7. When it is used as a double grill upon which to fry bacon 40 on grill plate 42 and an egg 39 on grill plate 41 it reclines and operates in the extended position shown in Fig. 2.

When this device is operated as a toaster as shown in Fig. 1 the toasting units 1 and 2 are latched together by snap catches 17, 20, and 18, 19. These catches hold the toaster units 1 and 2 together in order to insure structural stability, and also to interlock the pop-up levers 13 and 14 into one unified lever action so that the master lever 13 will carry upwards or downwards the lever 14 and with it both bread slice platforms 28 and 29. This will occur whenever the levers 13 and 14 are snapped together and raised or depressed by manual action on the levers from outside the toaster or by timed automatic action of the internal toast control unit 3.

When this appliance is to be converted from a toaster to a grill, it is manually tilted over on its side from the vertical position Fig. 1 to the position in Fig. 3 by the operator grasping the handles 8 and 9. Once the grilltoaster is on its side as shown in Fig. 3, the operator then holds handle 8 against the table and at the same time pulls handle 9 upwards. This action disengages the snap catches 17 and 18 from their corresponding wells and allows the grill plates 41 and 42 to be exposed for cooking. The operator then turns the switch 24 to the "grill" position which energizes heating elements 32 and 33 until they are again turned off by the operator turning the switch 24 back to the "toast" position.

Figure 4:
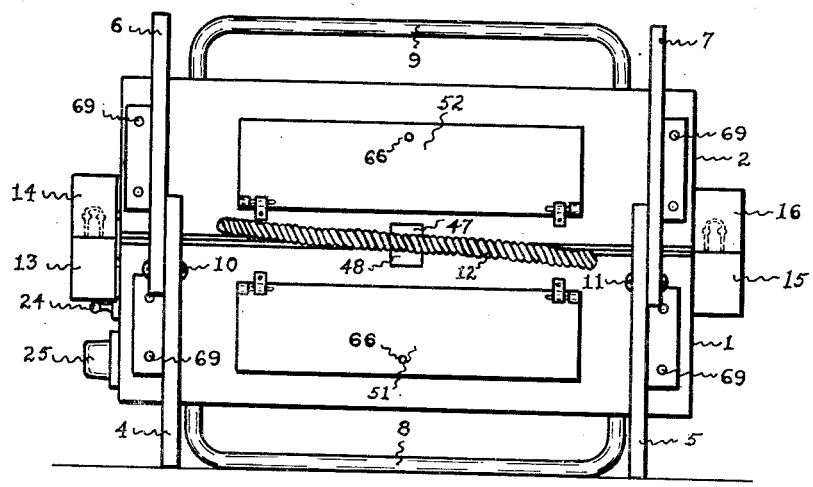
Figure 4 is a rear view of this invention as it would appear in a grilling position without a sandwich between the grill plates.
Figure 5:
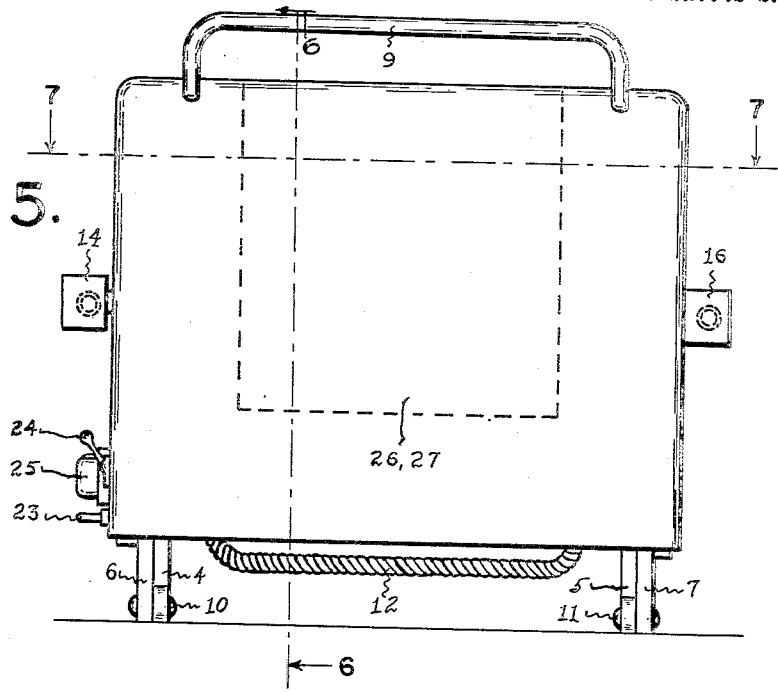
Figure 5 is a side view of the device in the toasting position.

When converting this device from a grill to a toaster, the operator first removes the sandwich 38 shown in Fig. 3 and allows the grill plates 41 and 42 to come together. The switch 24 is turned to the "toast" position. Then a gentle downward finger pressure is exerted by the operator on the upper surfaces of the levers 14 and 16 as shown in Fig. 3 in order to snap the catches 17 and 18 into the wells 19 and 20 as shown in Fig. 4. After this is completed the operator then manually tilts the entire device back to the vertical position in Fig. 1 by grasping the handles 8 and 9.

Levers 13 and 14 are both spring 30 and 31 loaded so that they are automatically urged to the up position shown in Fig. 1 unless restrained by the timing or control action of unit 3. The desirability of this arrangement is simply that the levers 13 and 14 will normally rise to a counter-facing position as shown in Fig. 1 which facilitates snap-catching these levers together when converting this device from a grill to a toaster.

To clean the bread crumbs or other droppings from the bottom of the toast wells 26 and 27 this device is placed in the position shown in Fig. 4. In this position, the operator opens the hinged cleaning doors 51 and 52 by means of the knobs 66 and brushes out the crumbs or food particles.

The spirit of this invention applies to three distinct types of electric bread slice toasters. It applies to the manually operated, side-door type of toaster shown in Figs. 11 and 12, and also to the automatic, manually-operated lever, type of toaster as shown in Fig. 1 through 10. It also applies to the completely automatic, power-driven control unit version of toaster, where the operator drops the bread slice into the toast well openings, and the toaster then automatically lowers the bread slices, toasts them to a pre-set degree and automatically raises them up again when toasted. The version requires no manual operation of pop-up levers by the operator to raise or lower bread slices.

Figure 11:
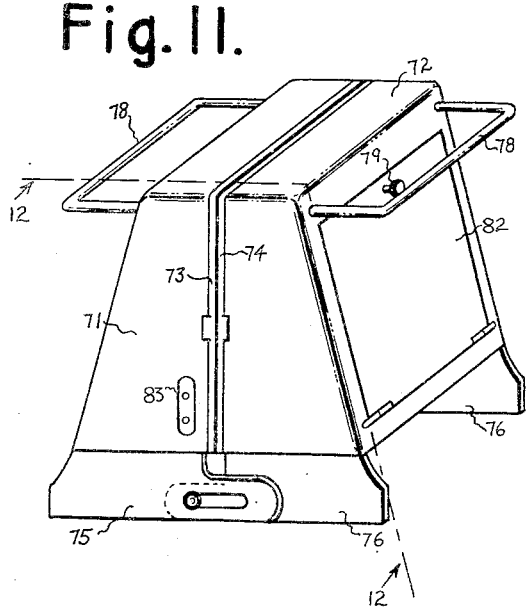
Figure 11 is a perspective view of a modification of this invention as applied to a non-automatic toaster.
Figure 12:
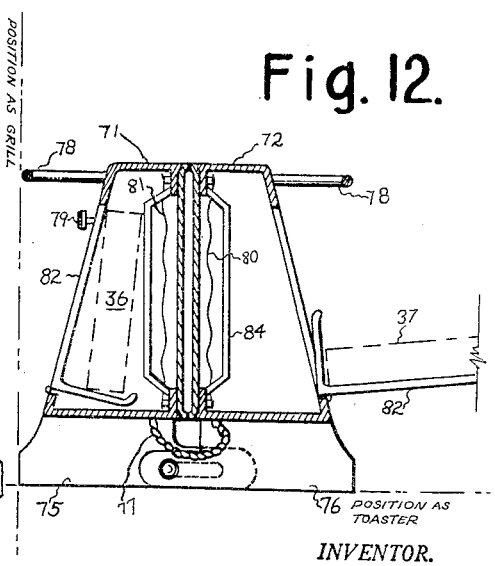
Figure 12 is a fragmentary sectional view taken on the line 12—12 of Figure 11.

Figs. 11 and 12 show an embodiment of this invention as applied to the low-priced, non-automatic toaster which contains spring-loaded, hinged side doors 82 for inserting bread slices 36 and 37. The master unit 71 contains no switch or control unit and when male plug 83 is connected it energizes the heating elements 80 and 81 which provide the heat for grill plates 73 and 74 and also toasts the bread slices 36 and 37. Units 71 and 72 are hingedly secured by expansible hinges 75 and 76 which are of essentially the same construction as those in Figs. 4, 6. Grill plates 73 and 74 and handles 78 and heating elements 80 and 81 are essentially of the same construction corresponding to plates 41 and 42 and handles 8 and 9 and elements 32 and 33 as shown in Figs. 1 through 8. In operation, the Figs. 11 and 12 version grilltoaster is turned on its side, unit 71 on bottom, for grilling a sandwich similar to Fig. 3, or opened up completely for grilling bacon and eggs similar to Fig. 2. As a toaster it stands vertically as shown in Figs. 11 and 12 and the bread slices 36 and 37 are inserted inside the toaster through the hinged doors 82 by means of knobs 79. This type of toaster only toasts one side of the bread 36 or 37 at a time, and consequently it is necessary to manually open the doors 82 which action turns the bread slice over for toasting on the reverse side by a flip-flop door action which is a conventional feature on this type of toaster.

In the grilltoaster shown in Figs. 11 and 12, the inner surfaces of the doors 82 should be chrome plated or like coated to reflect heat radiation back to the underside of grill plates 73 and 74. This results in a cooler appliance and improves the utilization of the heating elements 80 and 81 during the grilling process.

The grilltoaster shown in Figs. 11 and 12 does not need to be snap-latched together as the version shown in Fig. 1. All versions of the grilltoaster can be designed to operate without the necessity of using snap catches 17, 18, 19 and 20 as shown in Figs. 1 and 7, but it is desirable to use this arrangement in order to transmit the control or power action from one master unit, otherwise the grilltoaster would require the additional manufacturing cost of having two separate control units 3 in the automatic models.

As concerns the application of this invention to the completely automatic, power-driven, type of electric toaster as the "Sunbeam" Model No. T–20 or the "Toastmaster" "Power-Action" Model No. 1B16, the weight or presence of a bread slice on platform 28 would trigger the action of unit 3 which in this type of toaster would be both a control unit and a prime mover for platform 28 and lever 13. The bread platform 28 and rod 29 would be connected to control unit 3 by means of a lever, gears or the like in order to transmit the power and control action of unit 3 to the platform 28 and subsequently through the levers 13 and 14 to the platform 29. The construction and operation of the power-driven type of toaster would be essentially the same as the version shown in Figs. 1 through 10, except that internally a power means or prime mover would be contained within unit 3 which would transmit its action to platform 28. Catch member 59 would be replaced or supplemented by a lever or gear means which would movably connect platform 28 to power unit 3. In this version it would not be necessary to manually operate the levers 13 and 14.

The advantages of this invention are:

1. The bread-slice toaster units 1 and 2 are practically identical in internal and external construction, except that unit 1 has a control unit 3. This compact and standardized configuration for both units of the grilltoaster greatly reduces the manufacturing and maintenance costs for this type of appliance.

2. The dual-purpose hinges 4, 6 and 5, 7 provide a novel and simplified way of supporting this appliance and also reduces production costs by elimination of the need for sepaate base legs in addition to expansible hinges as conventionally required in sandwich grills prior to this invention.

3. The novel arrangement of fold-away grill plates 41 and 42 and the also novel utilization of toaster heating elements 32 and 33 to provide heat for these grill plates results in compactness, saves valuable kitchen space for the housewife, and further lowers manufacturing costs.

4. The snap catch members 18 and 19 and levers 13 and 14 provide a simplified method for transmitting the control and power action of control unit 3 to toast unit 2. This eliminates the need for two control units 3 and thereby reduces production costs and maintenance requirements for this appliance.

5. An advantage of the overall grilltoaster configuration is that it consolidates two well known kitchen appliances, the sandwich grill and the toaster, into one novel and compact appliance which only occupies the kitchen or restaurant space normally required by one conventional toaster.

The foregoing advantages and features are cumulative and complementary to each other and as such result in a practical grilltoaster configuration which can be manufactured at a price competitive to the combined costs of a comparable toaster and sandwich grill. These advantages and the word "grilltoaster" may well establish a new generic series of kitchen and restaurant appliances.

I do not mean to confine myself to the exact details of construction as herein disclosed, as variations and modifications may be made within the scope of this invention and portions of the improvements may be used without others. As such I claim all variations falling within the purview of the appended claims.

What is claimed is:

1. A combination toaster and grill comprising a pair of complementary toaster units, a hinge connection between said toaster units pivotally connecting said toaster units, each unit containing a grill plate which comprises the inner confronting side of each unit, and each unit containing a heating element, a bread slice platform, an internal toasting oven for a bread slice, access means for inserting the bread slice into said toasting oven, and means for discharging the bread slice from the toasting oven, said oven containing an internal heating element which is utilized to toast the bread slice and also heat the said grill plate, said hinges pivotally connecting each toaster unit at one edge, whereby the confronting grill plates may be compactly closed together when in the toasting position or spread out to form two horizontal flat plate grills or juxtaposed to grill the top and bottom of an article to be grilled, said hinges having extensions at one end thereof, said extensions serving as a base for said combination toaster and grill when in toasting position, handles carried by the opposite edges of each toaster unit, said handles and said hinge extensions serving as supports for said toaster and grill units when in spread grill or sandwich grilling position.

2. The construction of claim 1 wherein each toaster unit is of the automatic pop-up type, and each unit contains a toasting well, and means for operating the bread slice platforms so as to raise and lower bread slices, and timing control means for determining the amount of heat exposure to be given to the bread slices in both toaster units.

3. The structure of claim 2 wherein a latch means for holding said adjacent toaster units together in toasting position comprises an extension secured to the bread slice platform in each toast well, and means for interconnecting said extensions whereby said platforms operate in unison from a single timing control unit located in one of the two toaster units.

References Cited in the file of this patent

UNITED STATES PATENTS

| | | |
|---|---|---|
| 1,194,663 | Reinking | Aug. 15, 1916 |
| 1,687,712 | Chandler | Oct. 16, 1928 |
| 1,912,353 | Howe | May 30, 1933 |
| 2,001,285 | Rehm | May 14, 1935 |
| 2,029,620 | Johnson | Feb. 4, 1936 |
| 2,092,226 | Simons | Sept. 7, 1937 |
| 2,171,510 | Stirgwolt | Aug. 29, 1939 |